Dec. 16, 1924.

D. G. LORRAINE

VALVE

Filed Feb. 12, 1923

1,519,856

DAVID G. LORRAINE  INVENTOR.

BY

R. W. Smith

ATTORNEY.

Patented Dec. 16, 1924.

1,519,856

UNITED STATES PATENT OFFICE.

DAVID G. LORRAINE, OF LOS ANGELES, CALIFORNIA.

VALVE.

Application filed February 12, 1923. Serial No. 618,452.

*To all whom it may concern:*

Be it known that I, DAVID G. LORRAINE, a citizen of the United States, residing at Los Angeles, county of Los Angeles, State of California, have invented new and useful Improvements in Valves, of which the following is a specification.

This invention relates to valves of a type particularly adapted to be employed in pipe lines from oil wells, said valves tending to open by pressure in the pipe line and having spring means tending to yieldably counteract said pressure and close the valves, with means being provided for adjusting the tension of said spring means.

It is the object of the invention to increase the range of pressure adapted to be exerted against the valve by the spring mechanism, and to positively guide the movable portion of the valve, the construction affording an extremely simple, but compact and efficient arrangement, which may be readily taken apart and assembled.

The invention will be readily understood from the following description of the accompanying drawings, in which.

Figure 1:
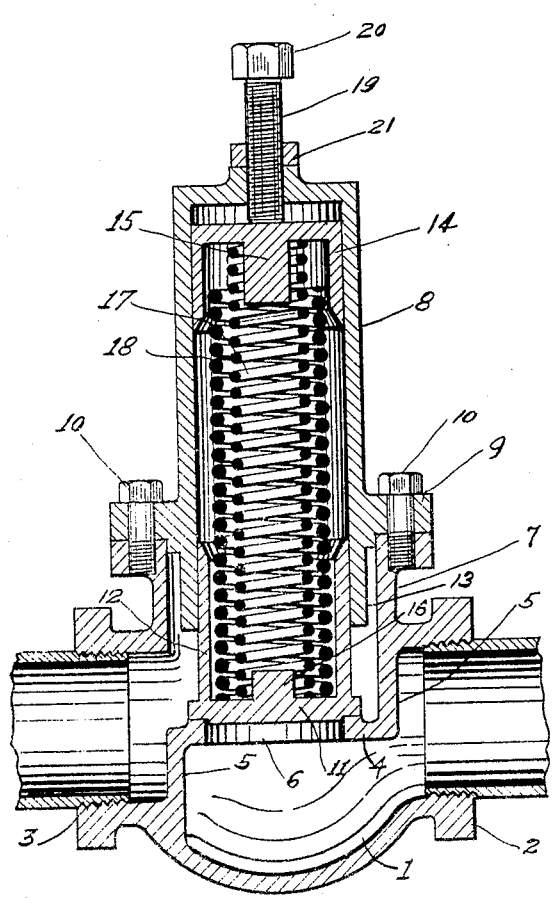
Fig. 1 is a vertical section through the valve showing the same closed.
Figure 2:
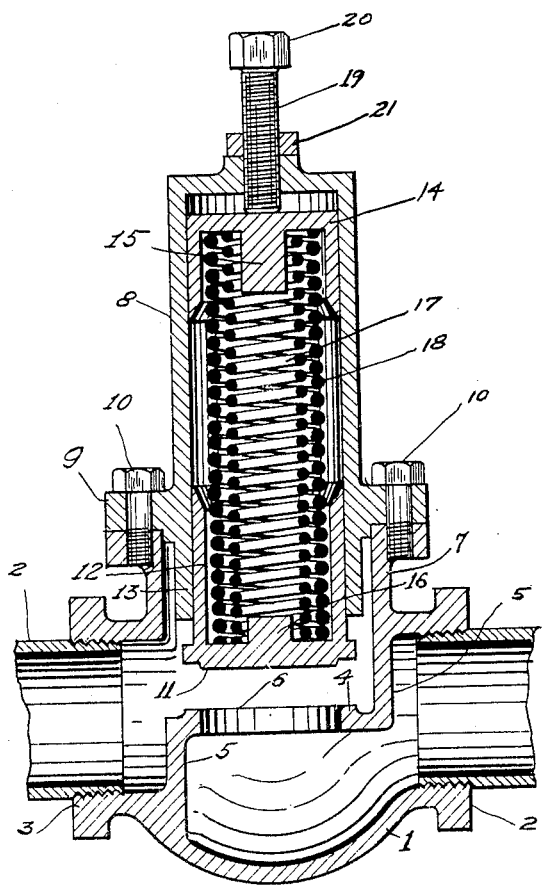
Fig. 2 is a similar view showing the valve open.

The improved valve includes a usual valve casing 1, having opposite flanged ports 2 and 3, which may be threaded to receive the inlet and outlet pipes. A partition 4 in the valve casing terminates at its ends in oppositely extending angularly disposed partitions 5 connected to opposite sides of the ports 2 and 3. A central opening 6 formed in partition 4 is provided for the passage of fluid through the valve casing from one side of the partition to the other.

A flanged opening 7, angularly disposed with relation to ports 2 and 3, is provided in the valve casing at one side of partition 4, and is adapted to receive the valve operating mechanism through the same. The operating mechanism is housed within a bonnet 8, shown as a cylindrical structure having a closed outer end, with its inner open end received in opening 7, and a flange 9 on said bonnet abutting against the flange of said opening. Bolts 10 are received through said flanges for fixing the bonnet in position.

The valve head cooperating with opening 6 and adapted to seat upon partition 4, is shown as a disc 11 having an upstanding annular flange 12 adapted to slide in an annular guide 13, formed by the inner end of bonnet 8 extending into the valve casing.

A cup 14 is provided in the outer end of bonnet 8, and said cup and the valve disc have axial, alined, projecting pins 15 and 16. A coil spring 17 extends the length of the bonnet with its ends received over pins 15—16 and abutting against cup 14 and the valve head 11.

A second spring 18, of relatively greater strength, is received around spring 17 with its ends extending into cup 14 and within the flange 12. One end of this spring abuts against valve head 11, and the opposite end thereof is normally spaced from the base of cup 14.

The cup 14 may be adjusted in bonnet 8 to vary the tension of spring 17, and as an instance of this arrangement, a bolt 19 is threaded through the outer end of the bonnet and projects beyond the same, with the inner end of said bolt received against cup 14. The outer end of the bolt has a usual operating head 20, and a lock nut 21 is threaded on said bolt and is adapted to be received against the end closure of bonnet 8.

In operation, the pressure of the fluid entering the valve casing will tend to open valve 11 against the tension of spring 17 which may be regulated by adjusting the bolt 19. As valve 11 continues to open by an increase in the fluid pressure, the spring 17 will be compressed so as to exert increasing pressure against said opening movement.

When the valve is open to a point where the outer end of spring 18 abuts against the base of cup 14, the tension of this stronger spring will be exerted against opening movement of the valve, and as the fluid pressure increases to still further open the valve, the compression of spring 18 will exert increasing pressure against opening movement.

It will thus be seen that increasing pressure is exerted against opening movement of the valve, by successive functioning of a plurality of springs, so that a greater range of pressure may be obtained than would be possible with a single spring.

As a consequence, opening movement of valve 11 is regulated by the spring mechanism, at all times throughout a wide range of variation in the pressure of the fluid entering the valve casing.

I claim:

1. The combination with a valve casing having an opening of a separable bonnet mounted on said casing over said opening and having a depending portion extending into said casing, said bonnet having a threaded bore in its upper end, a bolt threaded through said bore, an end abutment in said bonnet spaced from said casing and adapted to be impinged by said bolt for adjusting said end abutment, said end abutment having a central depending pin and a peripheral depending flange slidably fitting in said bonnet for guiding said end abutment, a valve head adapted to seat in said casing and having a central upstanding pin and a peripheral upstanding flange slidably fitting in the depending portion of said bonnet for guiding said valve head and closing the interior of said bonnet to the flow through said casing, and coil springs of different strength received one within another in said bonnet and having their ends received over said central pins within said peripheral flanges, said springs abutting at one end against said valve head, the weaker of said springs abutting at its opposite end against said end abutment, and the stronger of said springs normally terminating short of said end abutment at its opposite end.

2. The combination with a valve casing having an opening of a separable bonnet mounted on said casing over said opening, an end abutment in said bonnet spaced from said casing and having a central depending pin and a peripheral depending flange slidably fitting in said bonnet for guiding said end abutment, means for adjusting said end abutment in said bonnet, a valve head adapted to seat in said casing, and coil springs of different strength received one within another in said bonnet and abutting at one end against said valve head, the opposite ends of said springs being received over said central pin within said peripheral flange, with said opposite end of the weaker spring abutting against said end abutment, and said opposite end of the stronger spring normally terminating short of said end abutment.

3. The combination with a valve casing having an opening of a separable bonnet mounted on said casing over said opening and having a depending portion extending into said casing, an end abutment for said bonnet spaced from said casing, a valve head adapted to seat in said casing and having a central upstanding pin and a peripheral flange slidably fitting in the depending portion of the bonnet for guiding said valve head and closing the interior of the bonnet to the flow through the casing, and coil springs of different strength received one within another in said bonnet and having one of their ends received over said central pin within said peripheral flange and abutting against said valve head, the weaker of said springs abutting at its opposite end against said end abutment, and the stronger of said springs normally terminating short of said end abutment at its opposite end.

In testimony whereof I have signed my name to this specification.

DAVID G. LORRAINE.